(12) United States Patent  
Laperriere et al.

(10) Patent No.: US 10,751,602 B2  
(45) Date of Patent: *Aug. 25, 2020

(54) ARTICLE OF SPORT GEAR

(71) Applicant: BAUER HOCKEY, LLC, Exeter, NH (US)

(72) Inventors: Jean-Francois Laperriere, Prevost (CA); Thierry Krick, Coteau-du-Lac (CA); Robert Lavoie, Saint-Jerome (CA); Chin-Te Su, Doulio (TW); Lin-Yu Lee, Taichung (TW)

(73) Assignee: BAUER HOCKEY, LLC, Exeter, NH (US)

( * ) Notice: Subject to any disclaimer, the term of this patent is extended or adjusted under 35 U.S.C. 154(b) by 334 days.

This patent is subject to a terminal disclaimer.

(21) Appl. No.: 15/473,189

(22) Filed: Mar. 29, 2017

(65) Prior Publication Data

US 2017/0252634 A1 Sep. 7, 2017

Related U.S. Application Data

(63) Continuation of application No. 13/313,883, filed on Dec. 7, 2011, now Pat. No. 9,756,892.

(Continued)

(51) Int. Cl.
*A42B 1/06* (2006.01)
*A42B 1/22* (2006.01)
(Continued)

(52) U.S. Cl.
CPC ............ *A63B 71/081* (2013.01); *A42B 3/121* (2013.01); *A42B 3/125* (2013.01); *A42B 3/283* (2013.01);
(Continued)

(58) Field of Classification Search
CPC ....... A63B 71/08; A63B 71/081; A63B 71/10; A63B 71/12; A42B 3/12; A42B 3/121;
(Continued)

(56) References Cited

U.S. PATENT DOCUMENTS 3,125,762 A 3/1964 Glahe
3,507,727 A 4/1970 Marshack
(Continued)

FOREIGN PATENT DOCUMENTS

CA 2191678 5/1998
CA 2295346 12/2006
WO 1999044813 9/1999

OTHER PUBLICATIONS

Office Action dated Jan. 28, 2016 in connection with EP 11192449.4.

(Continued)

*Primary Examiner* — Jameson D Collier (57) ABSTRACT

A sport helmet for protecting a head of a wearer, such as a hockey, lacrosse or football player. The sport helmet includes an outer shell with an internal side and an external side and an inner pad mounted to the internal side of the outer shell for absorbing shocks when the sport helmet is impacted. The inner pad includes a core of polymeric cellular material with a body of expanded polymeric microspheres and a molded covering being molded onto the core of polymeric cellular material.

28 Claims, 11 Drawing Sheets

Related U.S. Application Data (60) Provisional application No. 61/512,325, filed on Jul. 27, 2011.

(51) Int. Cl.
| | | |
|---|---|---|
| *A42B 3/00* | (2006.01) | |
| *A63B 71/10* | (2006.01) | |
| *A63B 71/08* | (2006.01) | |
| *A42B 3/12* | (2006.01) | |
| *A42B 3/32* | (2006.01) | |
| *A42B 3/28* | (2006.01) | |
| *B29C 69/02* | (2006.01) | |
| *B29K 101/12* | (2006.01) | |
| *B29K 105/04* | (2006.01) | |
| *B29L 31/48* | (2006.01) | |

(52) U.S. Cl.
CPC ............ *A42B 3/324* (2013.01); *A63B 71/10* (2013.01); *B29C 69/02* (2013.01); *B29K 2101/12* (2013.01); *B29K 2105/04* (2013.01); *B29L 2031/4821* (2013.01)

(58) Field of Classification Search
CPC ......... A42B 3/125; A42B 3/127; A42B 3/128; A42B 3/283; A42B 3/324; A42B 3/06; A42B 3/062; A42B 3/063; B29L 2031/48; B29L 2031/4807; B29L 2031/4821; B29L 2031/4842; B32B 2437/04
USPC ............... 2/410, 411, 413, 414, 417, 425
See application file for complete search history.

(56) References Cited

U.S. PATENT DOCUMENTS

| | | | |
|---|---|---|---|
| 3,793,241 A | 2/1974 | Kistner et al. | |
| 3,882,547 A | 5/1975 | Morgan | |
| 4,083,127 A * | 4/1978 | Hanson | A43B 5/0405 |
| | | | 36/117.7 |
| 4,229,546 A * | 10/1980 | Swan, Jr. | C08J 9/32 |
| | | | 106/272 |
| 4,252,910 A | 2/1981 | Schaefer | |
| 4,255,202 A * | 3/1981 | Swan, Jr. | A43B 5/0405 |
| | | | 106/122 |
| 4,432,099 A | 2/1984 | Greck et al. | |
| 4,481,679 A | 11/1984 | Hayes | |
| 4,486,901 A * | 12/1984 | Donzis | A41D 13/0153 |
| | | | 2/22 |
| 5,035,009 A | 7/1991 | Wingo et al. | |
| 5,056,162 A | 10/1991 | Tirums | |
| 5,165,116 A | 11/1992 | Simpson | |
| 5,272,001 A * | 12/1993 | Weisman | C08J 9/32 |
| | | | 428/313.5 |
| 5,332,760 A * | 7/1994 | Weisman | C08J 9/32 |
| | | | 521/137 |
| 5,389,607 A | 2/1995 | Wood | |
| 5,418,257 A | 5/1995 | Weisman | |
| 5,429,869 A | 7/1995 | McGregor et al. | |
| 5,477,558 A | 12/1995 | Volker et al. | |
| 5,701,611 A | 12/1997 | Rector et al. | |
| 5,713,082 A | 2/1998 | Bassette et al. | |
| 5,867,840 A | 2/1999 | Hirosawa et al. | |
| 5,881,395 A * | 3/1999 | Donzis | A41D 13/0153 |
| | | | 2/455 |
| 5,930,840 A | 8/1999 | Arai | |
| 6,058,516 A | 5/2000 | Purnell | |
| 6,249,297 B1 | 6/2001 | Lion | |
| 6,298,497 B1 | 10/2001 | Chartrand | |
| 6,324,703 B1 | 12/2001 | Chen | |
| 6,389,607 B1 | 5/2002 | Wood | |
| 6,401,258 B1 | 6/2002 | Wilson | |
| 6,485,446 B1 | 11/2002 | Brother et al. | |
| 6,981,284 B2 | 1/2006 | Durocher | |
| 7,341,776 B1 | 3/2008 | Millren et al. | |
| 7,464,414 B2 | 12/2008 | McDuff | |
| 7,841,025 B1 | 11/2010 | Fink et al. | |
| 9,756,892 B2 * | 9/2017 | Laperriere | A42B 3/125 |
| 2002/0002730 A1 | 1/2002 | Dennis | |
| 2003/0135914 A1 | 7/2003 | Racine et al. | |
| 2003/0139104 A1 | 7/2003 | Arai | |
| 2005/0034222 A1 | 2/2005 | Durocher | |
| 2006/0031978 A1 | 2/2006 | Piece | |
| 2006/0112477 A1 | 6/2006 | Schneider | |
| 2007/0029690 A1 | 2/2007 | Green et al. | |
| 2007/0192943 A1 | 8/2007 | McDuff | |
| 2007/0266482 A1 | 11/2007 | Alexander et al. | |
| 2009/0255037 A1 * | 10/2009 | Sandusky | F41H 5/0492 |
| | | | 2/455 |
| 2009/0280290 A1 | 11/2009 | Weedlun | |
| 2010/0083423 A1 | 4/2010 | Erickson et al. | |
| 2010/0310822 A1 | 12/2010 | Jokisch | |
| 2013/0007950 A1 | 1/2013 | Arai | |

OTHER PUBLICATIONS

Office Action dated Mar. 7, 2016 issued in connection with U.S. Appl. No. 13/313,883.
Office Action dated Oct. 20, 2016 issued in connection with EP 11192449.4.
Final Office Action dated Nov. 9, 2016 issued in connection with U.S. Appl. No. 13/313,883.
Communication pursuant to Article 94(3) EPC issued by the European Patent Office dated Aug. 14, 2017, in connection with corresponding European Patent Application 11192449.4, 3 pages.
Examiner's Report issued by the Canadian Patent Office dated Feb. 6, 2018 in connection with corresponding Canadian Patent Application 2,761,122, 8 pages.
Examiner's Report issued by CIPO dated Dec. 19, 2018 in connection with CA patent application No. 2,761,122.

* cited by examiner

ARTICLE OF SPORT GEAR

CROSS-REFERENCE TO RELATED APPLICATIONS

This application is a continuation application of and claims priority to U.S. patent application Ser. No. 13/313,883 filed on Dec. 7, 2011, which claims priority under 35 U.S.C. 119(e) from U.S. Provisional Patent Application No. 61/512,325 filed on Jul. 27, 2011, both of which are hereby incorporated by reference herein.

FIELD OF THE INVENTION

The invention relates to sport helmets for protecting heads of wearers engaged in various sports, such as hockey, lacrosse, and football players.

BACKGROUND

Sport helmets are used in many sports, such as hockey, lacrosse and football, to name a few, for protecting their wearer's head.

For example, a hockey helmet for protecting a hockey player's head typically comprises an outer shell providing strength and rigidity for impact resistance and an inner pad contacting the hockey player's head and absorbing shocks when the hockey helmet is impacted (e.g., when the hockey helmet hits a board or an ice or other skating surface of a hockey rink or is struck by a puck or a hockey stick). To that end, the outer shell is made of rigid material such as hard plastic while the inner pad is made of shock-absorbing material such as polymeric foam mounted (e.g., by an adhesive or fasteners) to the outer shell's internal side. Helmets for other sports, such as lacrosse or football for example, sometimes have similar constructions.

Impact resistance and shock absorbance of a sport helmet are crucial for proper protection of a wearer's head, while weight of the sport helmet is often important for comfort and/or performance of the wearer.

Although there have been advances in sport helmet designs, there remains a need for improvements in sport helmets, including improvements directed to enhancing shock absorbance while reducing weight of sport helmets.

SUMMARY OF THE INVENTION

According to an aspect of the invention, there is provided a sport helmet for protecting a head of a wearer. The sport helmet comprises an outer shell comprising an internal side and an external side. The sport helmet also comprises an inner pad mounted to the internal side of the outer shell for absorbing shocks when the sport helmet is impacted. The inner pad comprises a core of polymeric cellular material and a covering on the core of polymeric cellular material.

According to another aspect of the invention, there is provided a sport helmet for protecting a head of a wearer. The sport helmet comprises an outer shell comprising an internal side and an external side. The sport helmet also comprises an inner pad mounted to the internal side of the outer shell for absorbing shocks when the sport helmet is impacted. The inner pad comprises a core of polymeric cellular material comprising expanded polymeric microspheres. Each of the expanded polymeric microspheres comprises a polymeric shell having been expanded by a fluid encapsulated in the polymeric shell. The inner pad also comprises a covering enveloping the core of polymeric cellular material.

According to another aspect of the invention, there is provided a sport helmet for protecting a head of a wearer. The sport helmet comprises an outer shell comprising an internal side and an external side. The outer shell comprises a first outer shell member and a second outer shell member that are movable relative to one another to adjust a size of the sport helmet. The sport helmet also comprises an inner pad mounted to the internal side of the outer shell for absorbing shocks when the sport helmet is impacted. The inner pad comprises a first pad member mounted to the first outer shell member. The first pad member comprises a first core of polymeric cellular material and a first covering on the first core of polymeric cellular material. The inner pad also comprises a second pad member mounted to the second outer shell member. The second pad member comprises a second core of polymeric cellular material and a second covering on the second core of polymeric cellular material.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided herein below, by way of example only, with reference to the accompanying drawings, in which.

In the drawings, embodiments of the invention are illustrated by way of examples. It is to be expressly understood that the description and drawings are only for the purpose of illustration and are an aid for understanding. They are not intended to be a definition of the limits of the invention.

DETAILED DESCRIPTION OF EMBODIMENTS OF THE INVENTION

Figure 1:
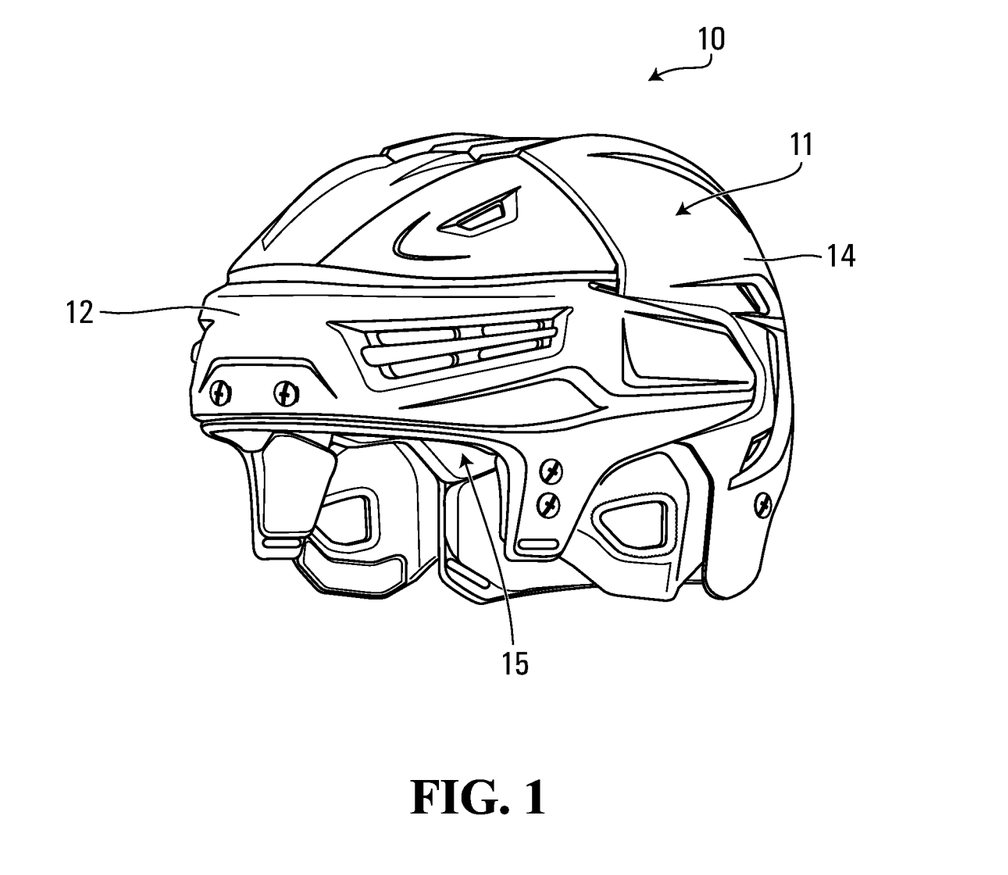
FIG. 1 shows a front perspective view of an example of a sport helmet in accordance with an embodiment of the invention.
Figure 2:
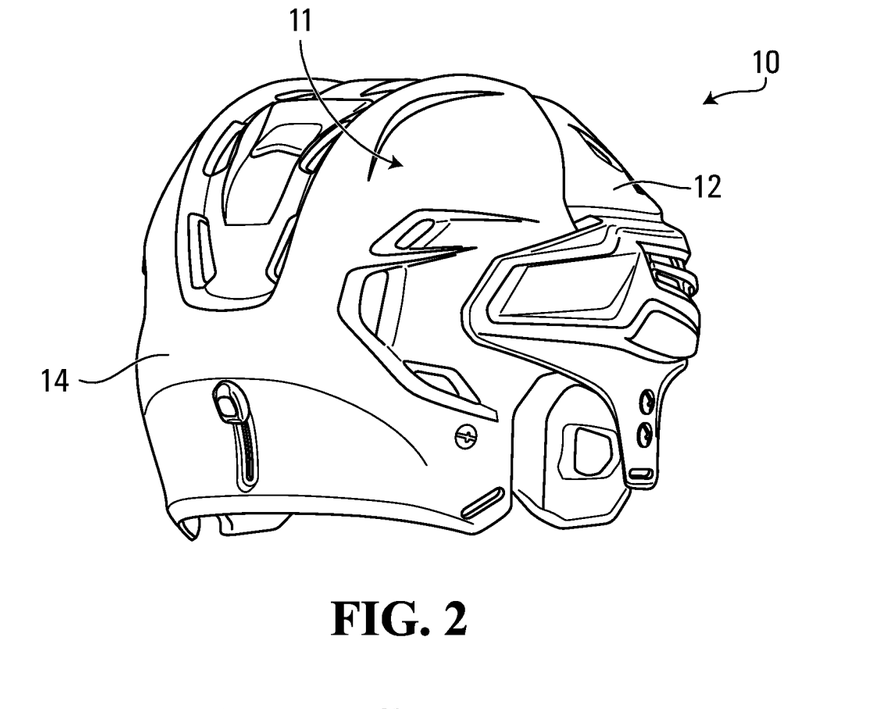
FIG. 2 shows a rear perspective view of the sport helmet.

FIGS. 1 and 2 show an example of a sport helmet 10 for protecting a head of a wearer in accordance with an embodiment of the invention. In this embodiment, the sport helmet 10 is a hockey helmet for protecting a hockey player's head.

Figure 14:
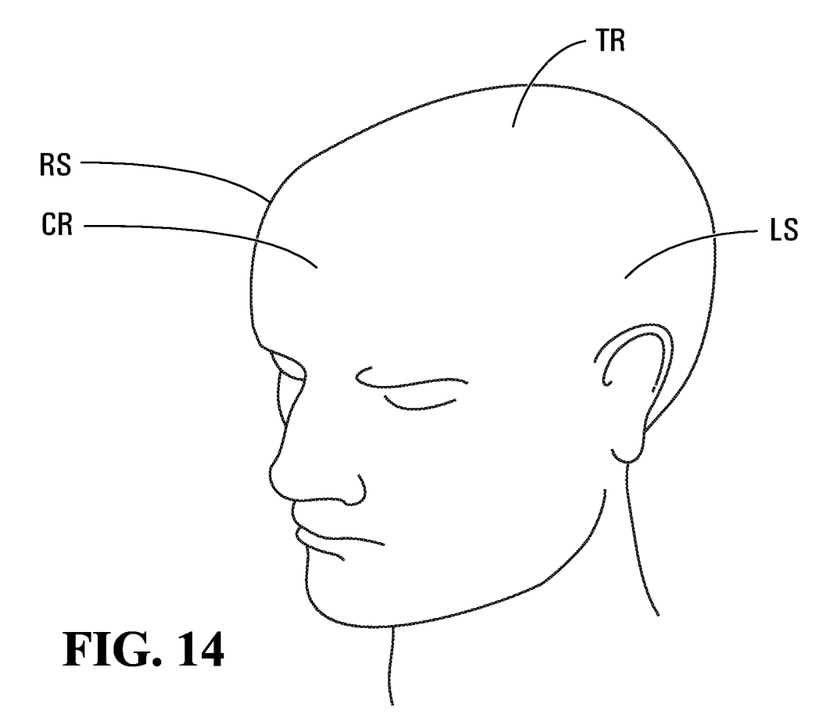
FIG. 14 is a perspective view of a head of a wearer of the sport helmet.
Figure 15:
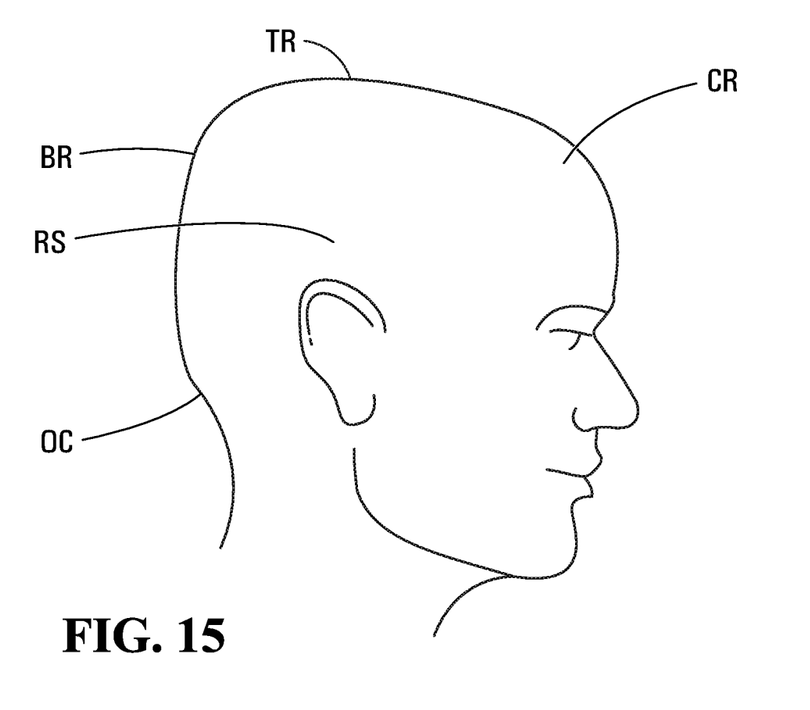
FIG. 15 is a right side elevational view of the head of the wearer.

The hockey helmet 10 covers various regions of the hockey player's head. As shown in FIGS. 14 and 15, the head of the hockey player comprises a crown region CR, a top region TR, left and right side regions LS, RS, a back region BR, and an occipital region OC. The crown region CR has a front part that substantially corresponds to the forehead and a top part that substantially corresponds to the front top part of the head. The crown region CR generally corresponds to the frontal bone region of the head. The left and right side regions LS, RS are approximately located above the player's ears. The occipital region OC substantially corresponds to the region around and under the head's external occipital protuberance.

Figure 8:
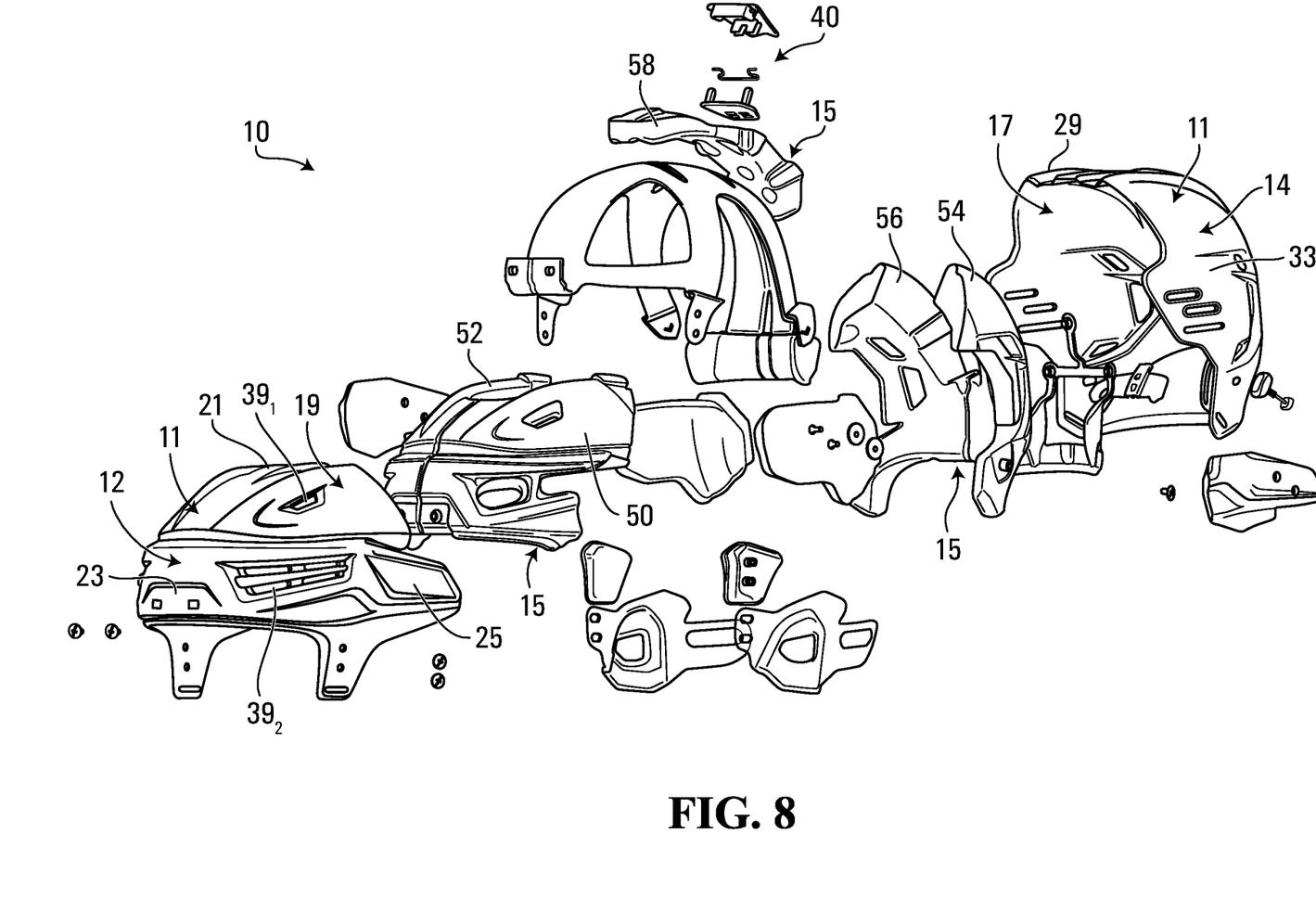
FIG. 8 shows a front perspective exploded view of the sport helmet.
Figure 9:
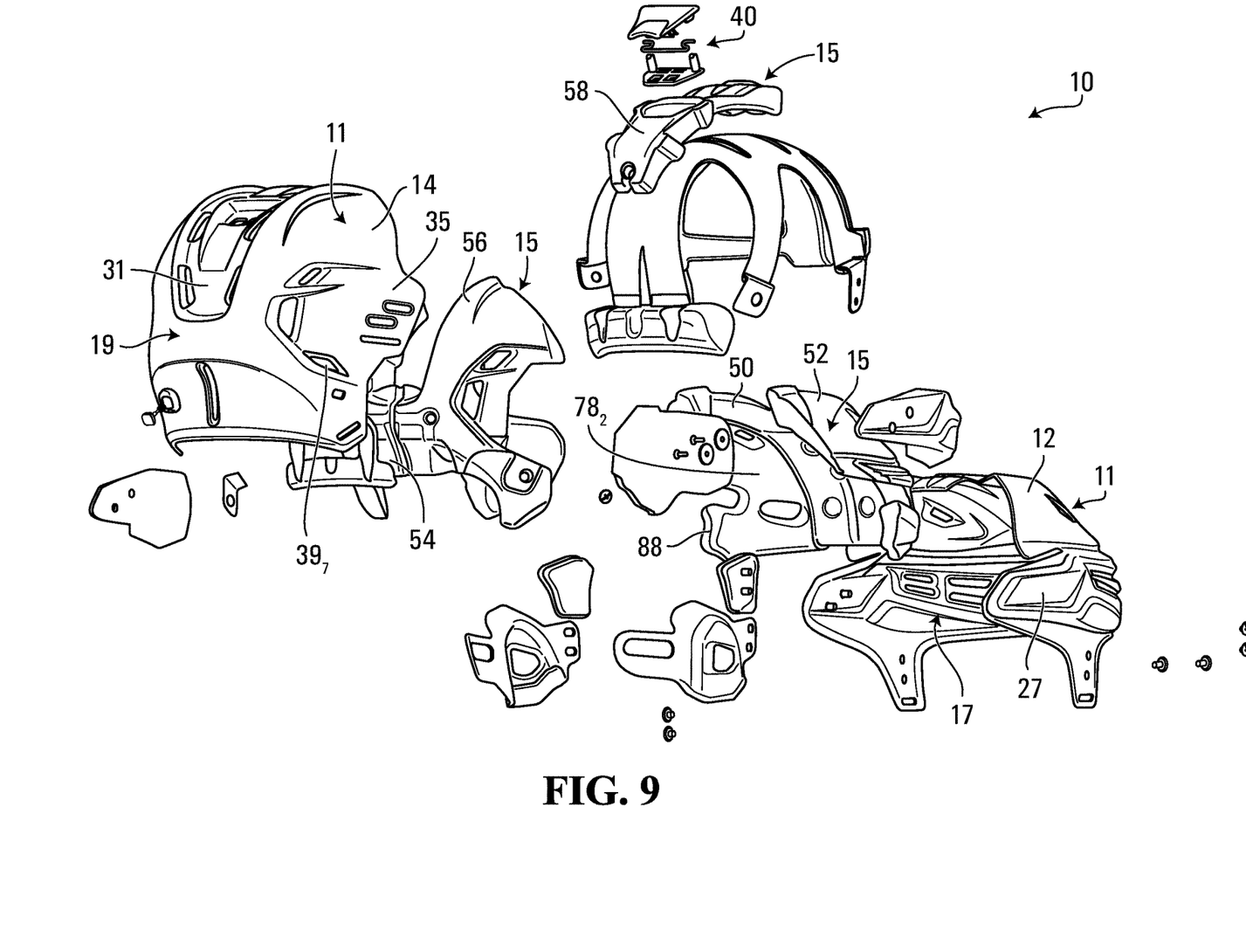
FIG. 9 shows a rear perspective exploded view of the sport helmet.

With additional reference to FIGS. 8 and 9, in this embodiment, the hockey helmet 10 comprises an outer shell 11 and an inner pad 15. The outer shell 11 comprises an internal side 17 and an external side 19. The inner pad 15 is positioned on the internal side 17 of the outer shell 11 such that, in use, the inner pad 15 is disposed between the outer shell 11 and the hockey player's head and absorb shocks when the hockey helmet 10 is impacted (e.g., when the hockey helmet 10 hits a board or an ice or other skating surface of a hockey rink or is struck by a puck or a hockey stick).

The outer shell 11 provides strength and rigidity to the hockey helmet 10. To that end, the outer shell 11 is made of rigid material. For example, in various embodiments, the outer shell 11 may be made of thermoplastic material such as polyethylene, polyamide (nylon), or polycarbonate, of thermosetting resin, or of any other suitable material. In this example of implementation, the outer shell 11 comprises a plurality of ventilation holes $39_1$-$39_V$ allowing air to circulate around the player's head for added comfort.

In this embodiment, the outer shell 11 comprises a front outer shell member 12 and a rear outer shell member 14 that are connected to one another. The front outer shell 12 comprises a top portion 21 for facing at least part of the top region TR of the player's head, a front portion 23 for facing at least part of the crown region CR of the player's head, and left and right side portions 25, 27 extending rearwardly from the front portion 23 for facing at least part of the left and right side regions LS, RS of the player's head. The rear outer shell member 14 comprises a top portion 29 for facing at least part of the top region TR of the player's head, a rear portion 31 for facing at least part of the back region BR and occipital region OR of the player's head, and left and right side portions 33, 35 extending forwardly from the rear portion 31 for facing at least part of the left and right side regions LS, RS of the player's head. In this case, each of the front and rear outer shell members 12, 14 defines respective ones of the ventilation holes $39_1$-$39_V$ of the outer shell 11.

Figure 3:
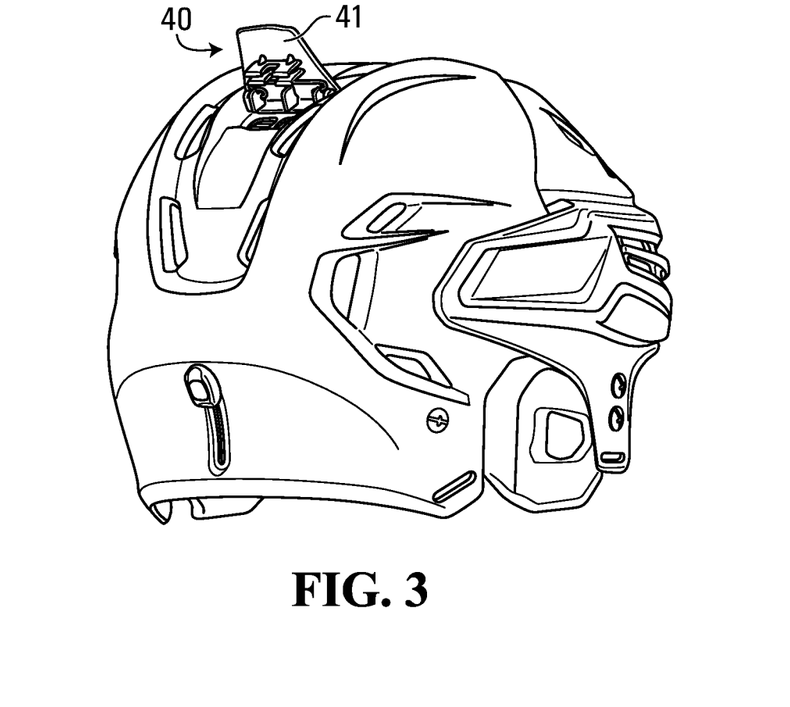
FIG. 3 shows another rear perspective view of the sport helmet in which an actuator of an adjustment mechanism is in a release position.
Figure 4:
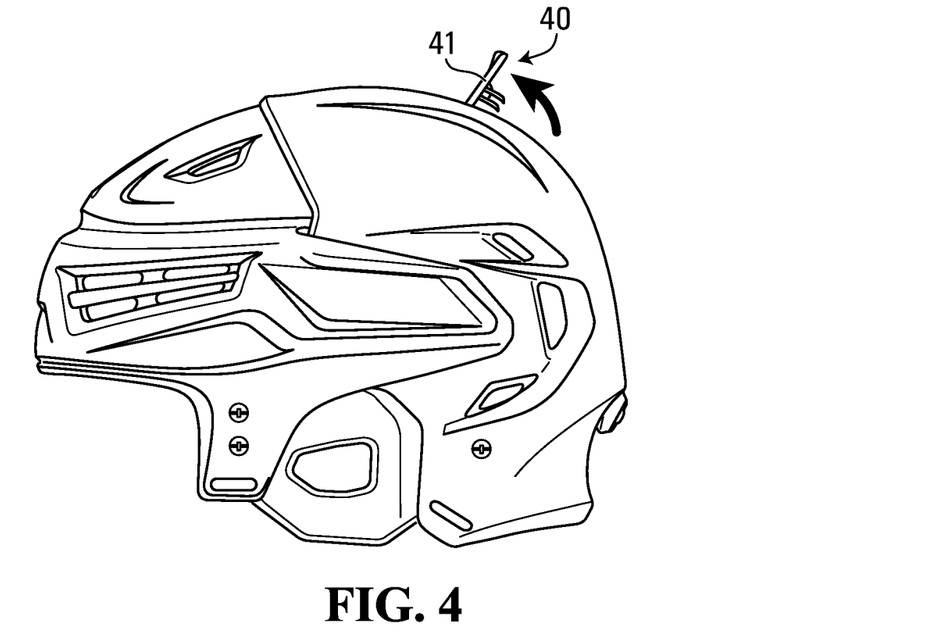
FIGS. 4 to 7 show side views of the sport helmet in which a size of the sport helmet is adjusted.
Figure 5:
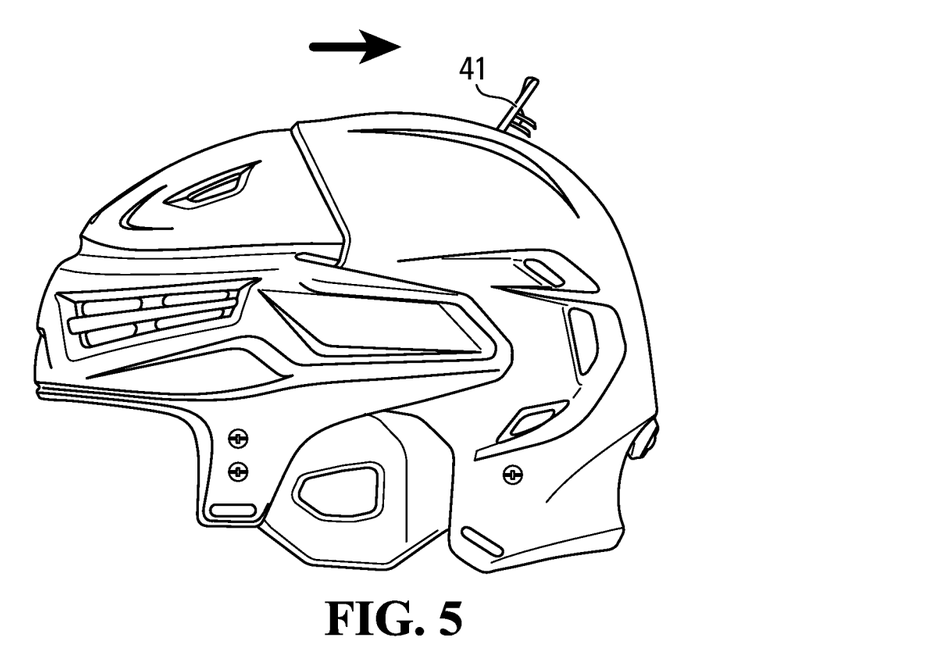
Figure 6:
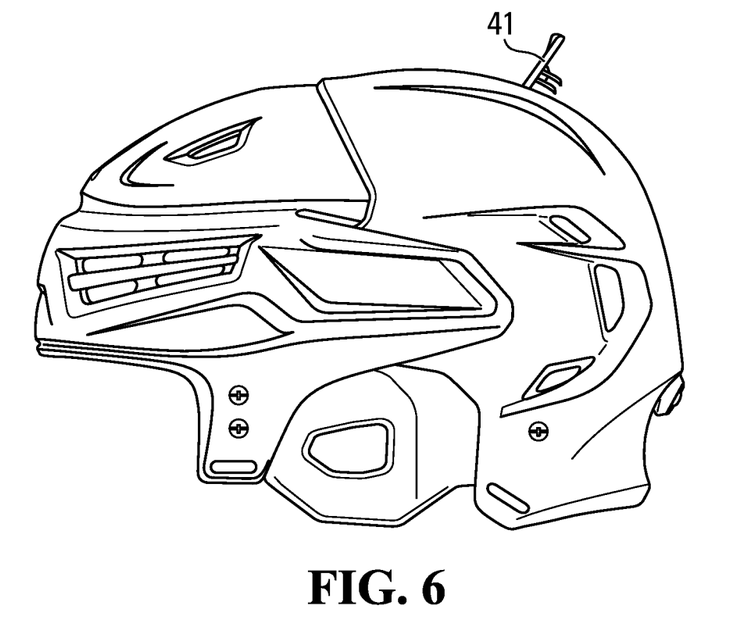
Figure 7:
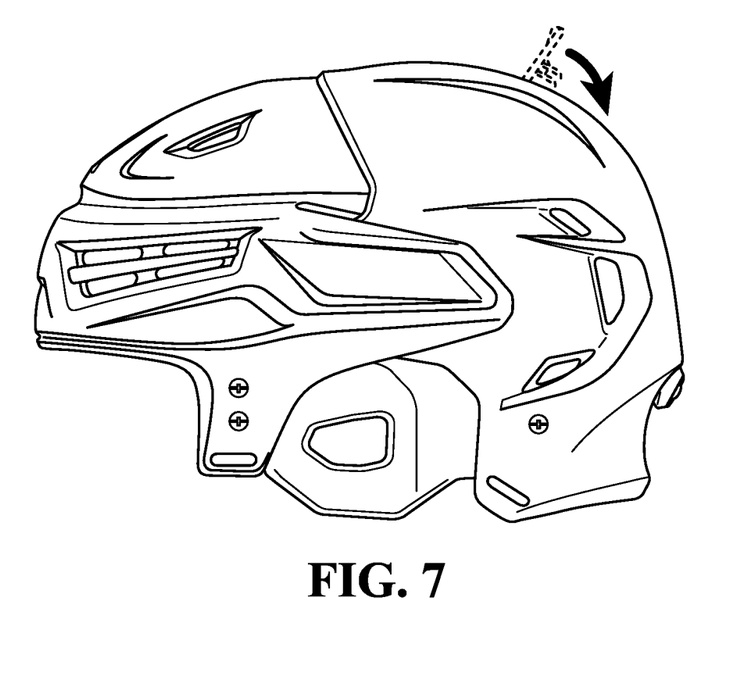

With additional reference to FIGS. 3 to 7, in this embodiment, the front outer shell member 12 and the rear outer shell member 14 are movable relative to one another to adjust a size of the hockey helmet 10 to fit the head of the hockey player. To that end, the hockey helmet 10 comprises an adjustment mechanism 40 connected between the front outer shell member 12 and the rear outer shell member 14 to enable adjustment of the size of the hockey helmet 10 by moving the outer shell members 12, 14 relative to one another in a direction generally parallel to a longitudinal axis of the hockey helmet 10. This is shown in FIGS. 4 to 7 in which the rear outer shell member 14 is moved relative to the front outer shell member 12 in the direction indicated by the arrow in FIG. 5 from a first position, which is shown in FIG. 4 and which corresponds to a relatively small size of the helmet 10, to a second position, which is shown in FIG. 5 and which corresponds to an intermediate size of the helmet 10, and to a third position, which is shown in FIG. 6 and which corresponds to a relatively large size of the helmet 10.

In this embodiment, the adjustment mechanism 40 comprises an actuator 41 that can be pivoted by the hockey player between a locked position, in which the actuator 41 engages a locking part 51 of the front outer shell member 12 and thereby locks the outer shell members 12, 14 relative to one another, and a release position, in which the actuator 41 is disengaged from the locking part 51 of the front outer shell member 12 and thereby permits the outer shell members 12, 14 to move relative to one another so as to adjust the size of the helmet 10. The adjustment mechanism 40 may be implemented in various other ways in other embodiments.

The inner pad 15 is mounted to the internal side 17 of the outer shell 11. For example, in various embodiments, the inner pad 15 may be mounted to the internal side 17 of the outer shell 11 by an adhesive, stitches, fasteners (e.g., tacks, staples, rivets, etc.), or any other suitable attachment means. The inner pad 15 has a three-dimensional external configuration that generally conforms to a three-dimensional internal configuration of the outer shell 11. As further discussed below, the inner pad 15 comprises shock-absorbing material to absorb shocks when the hockey helmet 10 is impacted.

In this embodiment, the inner pad 15 comprises a front left inner pad member 50 for contacting at least part of the crown region CR and left side region LS of the player's head, a front right inner pad member 52 for contacting at least part of the crown region CR and right side region LS of the player's head, a rear left inner pad member 54 for contacting at least part of the back region BR and left side region LS of the player's head, a rear right inner pad member 56 for contacting at least part of the back region CR and right side region LS of the player's head, and a top inner pad member 58 for contacting at least part of the top region TR and back region BR of the player's head. The front outer shell member 12 overlays the front left and right inner pad members 50, 52 while the rear outer shell member 14 overlays the rear left and right rear inner pad members 54, 56 and the top inner pad member 58.

Figure 10:
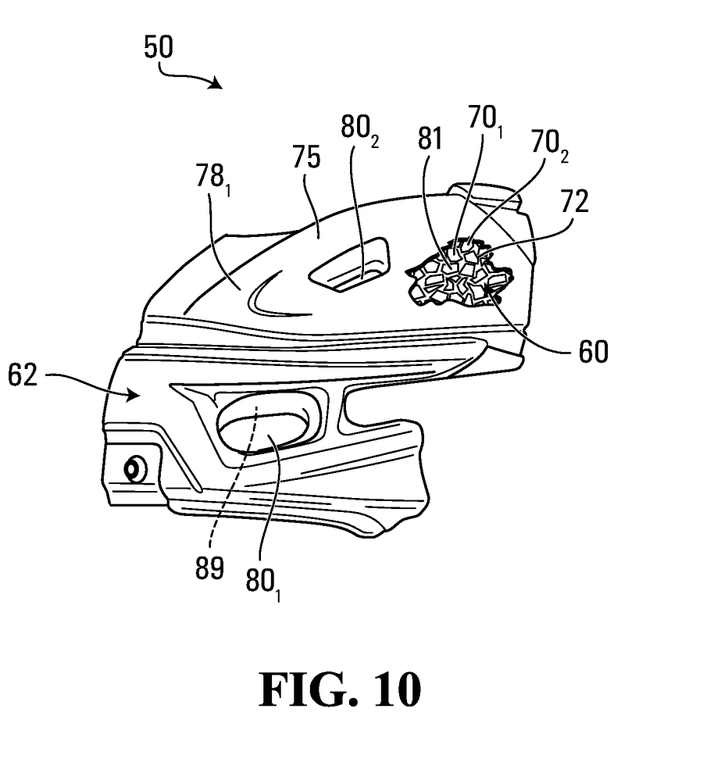
FIG. 10 shows a side view of a pad member of an inner pad of the sport helmet.
Figure 11:
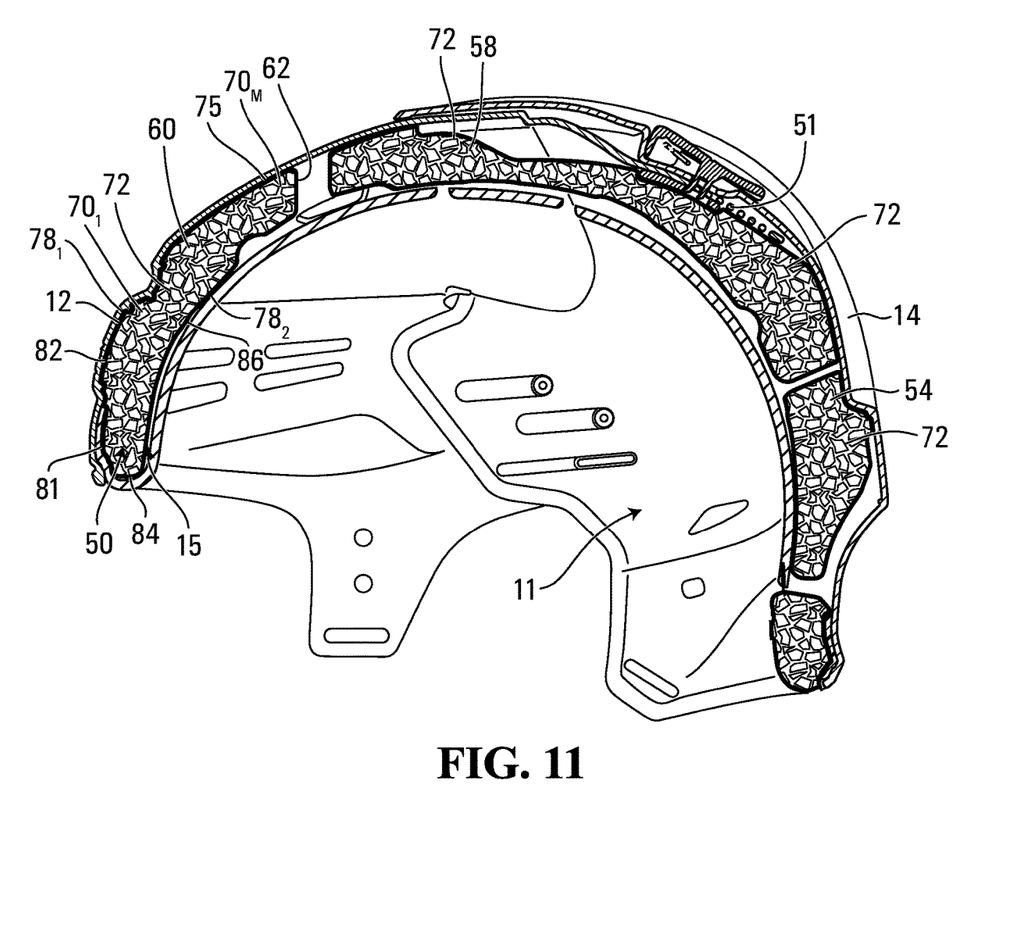
FIG. 11 shows a cross-sectional view of the sport helmet.

As shown in FIGS. 10 and 11, the front left inner pad member 50 comprises a core of polymeric cellular material 60 and a covering 62 on the core of polymeric cellular material 60.

The core of polymeric cellular material 60 has a periphery 81 comprising an outer side 82 facing outwardly (i.e., towards the outer shell 11), an inner side 86 facing inwardly (i.e., towards the hockey player's head), and a lateral side 84 between the outer side 82 and the inner side 86. The periphery 81 of the core of polymeric cellular material 60 defines the three-dimensional external configuration of the inner pad 15.

As shown in FIG. 11, in this embodiment, a thickness of the core of polymeric cellular material 60 is such that, in a longitudinal cross-section of the sport helmet 10, the core of polymeric cellular material 60 occupies a majority of a thickness measured from the external side 19 of the outer shell 11 to the inner side 86 of the core of polymeric cellular material 60.

The polymeric cellular material 60 is a polymeric material having a cellular structure which forms a network of cells held together. Various types of polymeric cellular material may be used in various embodiments.

For example, in this embodiment, the core of polymeric cellular material 60 comprises a body of expanded polymeric microspheres $70_1$-$70_M$. Each expanded polymeric microsphere $70_x$ comprises a polymeric shell 72 that has been expanded by a fluid encapsulated in an interior of the polymeric shell 72. In this example of implementation, the polymeric shell 72 of the expanded polymeric microsphere $70_x$ is a thermoplastic shell. The fluid encapsulated in the polymeric shell 72 of the expanded polymeric microsphere $70_x$ is a liquid or gas (in this case a gas) which has been used to expand the microsphere $70_x$ when heated during manufacturing of the front left inner pad member 50, as further discussed below. More particularly, in this example of implementation, the expanded polymeric microspheres $70_1$-$70_M$ are Expancel™ microspheres commercialized by Akzo Nobel. Various other types of expanded polymeric microspheres $70_1$-$70_M$ may be used in other embodiments.

The body of expanded polymeric microspheres $70_1$-$70_M$ is at least a main constituent of the core of polymeric cellular material 60. That is, the body of expanded polymeric microspheres $70_1$-$70_M$ is a sole constituent of the core of polymeric cellular material 60 or, if the core of polymeric cellular material 60 is constituted of two or more constituents, is the main constituent. For example, in various embodiments, the body of expanded polymeric microspheres $70_1$-$70_M$ may represent at least 80%, in some cases at least 85%, in some cases at least 90%, in some cases at least 95%, and in some cases 100% of the core of polymeric cellular material 60 (by weight). In this embodiment, the body of expanded polymeric microspheres $70_1$-$70_M$ represents about 95% of the core of polymeric cellular material 60, and a color pigment substance represents about 5% of the core of polymeric cellular material 60.

Figure 13:
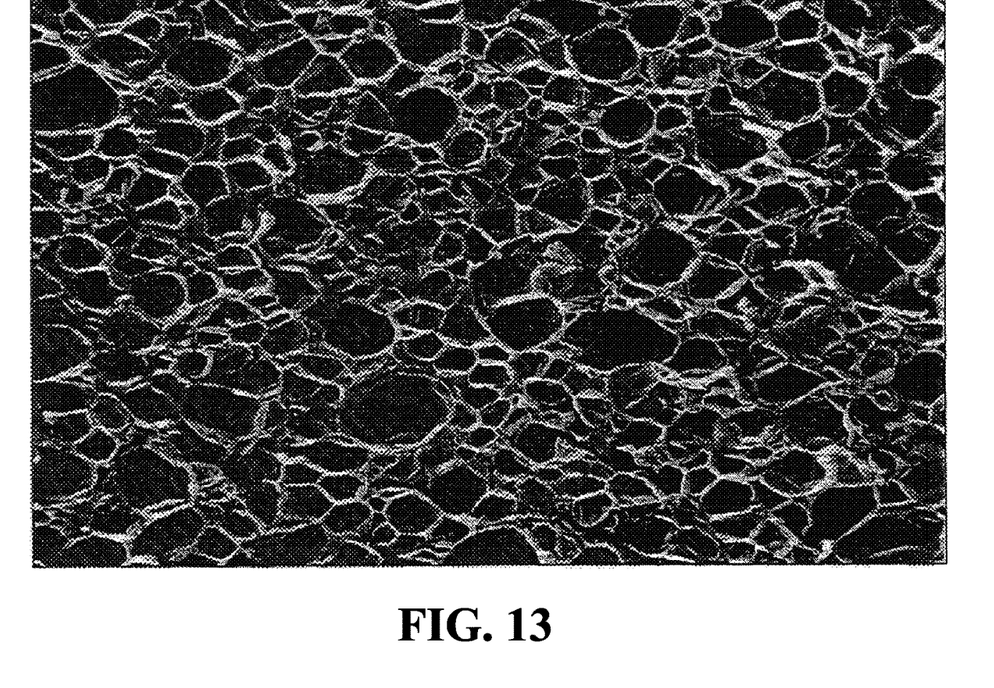
FIG. 13 shows an example of a photograph of expanded polymeric microspheres of a core of polymeric cellular material of the inner pad of the sport helmet.

The expanded polymeric microspheres $70_1$-$70_M$ may have various sizes in various embodiments. For example, in some embodiments, the expanded polymeric microspheres $70_1$-$70_M$ may have a size between 10 microns and 25 microns before being expanded and a size between 20 microns and 120 microns after being expanded. In other embodiments, the expanded polymeric microspheres $70_1$-$70_M$ may have any other suitable sizes. It is noted that in FIGS. 10 and 11 the size of the expanded polymeric microspheres $70_1$-$70_M$ is enlarged in order to schematically illustrate them and that the expanded polymeric microspheres $70_1$-$70_M$ are considerably smaller in reality. FIG. 13 shows an example of a photography of expanded polymeric microspheres in an enlarged scale.

A density of the body of expanded polymeric microspheres $70_1$-$70_M$ may have various values in various embodiments. For example, in some embodiments, the density of the body of expanded polymeric microspheres $70_1$-$70_M$ may be less than 0.04 g/cm$^3$, in some cases no more 0.035 g/cm$^3$, and in some cases even less. For instance, in some embodiments, the density of the body of expanded polymeric microspheres $70_1$-$70_M$ may be between 0.030 g/cm$^3$ to 0.035 g/cm$^3$. The density of the body of expanded polymeric microspheres $70_1$-$70_M$ may have any other suitable value in other embodiments.

In other embodiments, the polymeric cellular material 60 may comprise expanded polypropylene (EPP) foam, expanded polyethylene (EPE) foam, or any other suitable polymeric foam material.

The covering 62 covers at least part of the core of polymeric cellular material 60. This may help to retain integrity of the core of polymeric cellular material 60. In particular, in this embodiment in which the core of polymeric cellular material 60 comprises the body of expanded polymeric microspheres $70_1$-$70_M$, the covering 62 may help to enhance a resistance of the body of expanded polymeric microspheres $70_1$-$70_M$ to chipping, crumbling or cracking in use.

In this embodiment, the covering 62 covers at least a majority of the periphery 81 of the core of polymeric cellular material 60. More particularly, in this example, the covering 62 covers at least a majority, in this case all, of the inner side 86 of the core of polymeric cellular material 60. Also, in this example, the covering 62 covers at least a majority, in this case all, of the outer side 82 of the core of polymeric cellular material 60 and at least a majority, in this case all, of the lateral side 84 of the core of polymeric cellular material 60. Thus, in this example, the covering 62 envelopes the core of polymeric cellular material 60. That is, the covering 62 completely encloses the core of polymeric cellular material 60. This may help to maximize an effect of the covering 62 in retaining integrity of the core of polymeric cellular material 60.

The covering 62 may cover less than an entirety of the core of polymeric cellular material 60 in other embodiments. For example, in other embodiments, certain regions of the inner side 86 of the core of polymeric material 60 may not be covered by the covering 62 but may rather be exposed. As another example, in other embodiments, the covering 62 may not cover part or all of the outer side 82 of the core of polymeric cellular material 60.

In this embodiment, the covering 62 comprises a fabric layer 75. More particularly, in this example of implementation, the fabric layer 75 is a non-woven fabric layer. In other examples, the fabric layer 75 may be a woven fabric layer. The fabric layer 75 may be selected such that it has a limited stretching ability to stay firmly on the core of polymeric cellular material 60. For instance, in various embodiments, the fabric layer 75 may comprise spandex, nylon, polyester, polypropylene, or any other suitable fabric material.

More particularly, in this embodiment, the covering 62 comprises a first covering portion $78_1$ covering the outer side 82 and part of the lateral side 84 of the core of polymeric cellular material 60 and a second covering portion $78_2$ covering the inner side 86 and part of the lateral surface 84 of the core of polymeric cellular material 60. The covering portions $78_1$, $78_2$ are joined together at a seam 88 extending along the lateral 84 of the core of polymeric cellular material 60. Specifically, in this embodiment, the fabric layer 75 comprises a first fabric member constituting the first covering portion $78_1$ and a second fabric member constituting the second covering portion $78_2$ and these two fabric members are jointed together at the seam 88.

Figure 12:
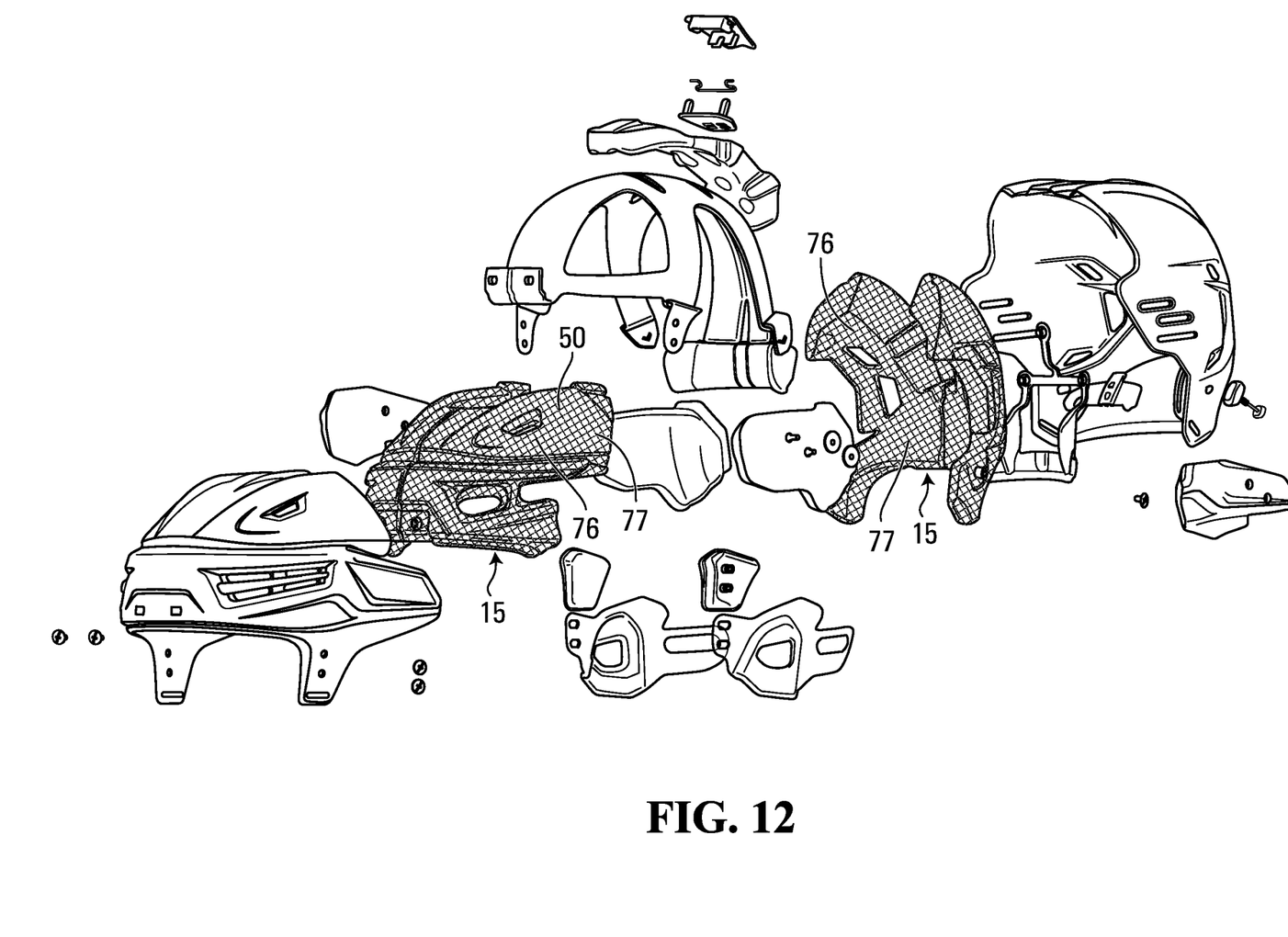
FIG. 12 shows a rear perspective exploded view of the sport helmet in which a covering of the inner pad is decorated.

The covering 62 may be used to enhance an appearance of the front left inner pad member 50. For example, as shown in FIG. 12, in some embodiments, the covering 62 may be decorated such that it displays a decoration 76 that includes an arrangement of two or more different colors. More particularly, in this embodiment, the decoration 76 is a decorative pattern 77 defined by the fabric layer 75. In this case, the decorative pattern 77 includes lines in one color which are spaced apart by areas having another color and which cross other lines. The decorative pattern 77 may take on any other suitable configuration in other cases.

The decoration 76 displayed by the covering 62 may be various other types of decoration in other embodiments. For example, in some embodiments, the arrangement of colors of the decoration 76 displayed by the covering 62 may represent colors and/or a logo of a sports team for which the hockey player plays.

The decoration 76 may be provided in various ways. For example, in this embodiment, the decoration 76 is a sublimated decoration created using a sublimation process on the fabric layer 75. The decoration 76 may be created using any other suitable technique (e.g., painting, drawing, silkscreening, roller printing, pad printing, etc.) in other embodiments.

The covering 62 is affixed to the core of polymeric material 60. More particularly, in this embodiment, the covering 62 is bonded to the core of polymeric cellular material 60 during a molding process used to manufacture the front left inner pad member 50, as further discussed below.

The covering 62 may have any suitable thickness. For example, in some embodiments, the thickness of the covering 62 may be at least 0.05 mm, in some cases at least 0.1 mm, in some cases at least 0.2 mm, in some cases at least 0.3 mm, and in some cases more (e.g., 1 mm). The covering 62 may be thinner than 0.05 mm in some cases.

The covering 62 may have any suitable strength properties. For instance, in some embodiments, the covering 62 may be such that it does not tear or otherwise fail when the hockey helmet 10 is tested to meet a standard (e.g., the Canadian Standards Association (CSA) cold impact resistance standard).

The covering 62 may be implemented in various ways in other embodiments. For example, in other embodiments, the covering 62 may comprise two or more stacked layers (e.g., the fabric layer 75, which may be used for resistance of the covering 62, and an additional fabric layer or non-fabric layer stacked over the fabric layer 75, which may be used for decoration, comfort, antibacterial protection, etc.). As another example, in other embodiments, the covering 62 may comprise a coating of a substance on the core of polymeric cellular material 60 (e.g., by dipping the core of polymeric cellular material 60 in the substance or otherwise applying the substance on the core of polymeric cellular material 60 to form the coating).

In this embodiment, the front inner pad member 50 comprises a plurality of ventilation holes $80_1$, $80_2$. In this case, the ventilation holes $80_1$, $80_2$ are aligned with respective ones of the ventilation holes $39_1$-$39_V$ of the outer shell 11. Each ventilation hole $80_1$ of the front inner pad member 50 extends through the core of polymeric cellular material 60 and is defined by an interior surface 89 of the core of polymeric cellular material 60 that is covered by the covering 62. The ventilation holes $80_1$, $80_2$ may have any suitable shape.

The front left inner pad member 50 may be manufactured in various ways. In this embodiment, the front left inner pad member 50 is a molded pad member in which the core of polymeric cellular material 60 is molded into shape and the covering 62 is molded onto the core of polymeric cellular material 60.

More particularly, in this embodiment, the front left inner pad member 50 is manufactured using a manufacturing process which comprises the following steps:

Step 200: Pre-expansion of unexpanded microspheres. In this step, an amount of unexpanded polymeric microspheres is heated to pre-expand the microspheres, thereby producing pre-expanded microspheres. For example, in this example, an amount of Expancel™ dry unexpanded microspheres in a loose powder form is heated to pre-expand the microspheres.

Step 210: Molding of core of polymeric cellular material. A quantity of the pre-expanded microspheres is placed into a mold for molding the core of polymeric cellular material 60. Any other constituent of the core of polymeric cellular material 60, such as the color pigment substance in this case, may be placed into the mold with the pre-expanded microspheres. Also, in some cases, an amount of expanded microspheres (i.e., microspheres expanded to their final size) may also be added into the mold.

The core of polymeric cellular material 60 is molded in the mold by applying heat. The molding temperature may be higher than the temperature used for the pre-expansion step. As part of the molding process, the pre-expanded microspheres further expand into their final size. The molding process may then include a cold molding phase in which the temperature is lowered. The temperature and pressure of the molding process cause bonding of adjacent ones of the expanded microspheres.

Step 220: Molding of covering onto core of polymeric cellular material. The covering 62 is molded onto the core of polymeric cellular material 60. In this embodiment, the covering 62 has been prepared for its placement onto the core of polymeric cellular material 60. More particularly, in this case, the first fabric member and the second fabric member of the fabric layer 75, which will respectively form the first covering portion $78_1$ and the second covering portion $78_2$ of the covering 62, have been previously prepared by cutting them from one or more sheets of fabric. Also, in this case, these two fabric members have been previously decorated with the decoration 76 using a prior sublimation process.

The first fabric member and the second fabric member of the fabric layer 75 are placed into a mold (which may be the same mold as that used in step 210 or a different mold) with the core of polymeric cellular material 60 positioned between them. In this embodiment, a hot-melt adhesive film or another adhesive is associated with each of the first fabric member and the second fabric member of the fabric layer 75 to enhance bonding of the fabric layer 75 to the core of polymeric cellular material 60.

The first fabric member and the second fabric member of the fabric layer 75 are molded onto the core of polymeric cellular material 60 in the mold by heating. The hot-melt adhesive film or other adhesive associated with each of the first fabric member and the second fabric member of the fabric layer 75 enhances bonding of the fabric layer 75 to the core of polymeric cellular material 60. The seam 88 is created where the first fabric member and the second fabric member of the fabric layer 75 meet. The molding process may then include a cold molding phase in which the temperature is lowered.

Step 230: Finishing of pad member. The core of polymeric cellular material 60 with the covering 62 molded onto is removed from the mold and finished. For example, in this embodiment, a trimming operation may be performed to remove excess material from the first fabric member and the second fabric member of the fabric layer 75 that extends beyond the core of polymeric cellular material 60.

The front left inner pad member 50 may be manufactured using various other manufacturing techniques in other embodiments.

In this embodiment, each of the front right inner pad member 52, the rear left inner pad member 54, the rear right inner pad member 56, and the top inner pad member 58 is constructed and manufactured as described above in respect of the front left inner pad member 50. In particular, each of the pad members 52, 54, 56, 58 comprises a core of polymeric cellular material like the core of polymeric cellular material 60 of the pad member 50 and a covering enveloping its core of polymeric cellular material like the covering 62 of the pad member 50.

The inner pad 15 may provide greater shock absorbance while being lighter than conventional foam pads (e.g., vinyl nitrile (VN) or expanded polypropylene (EPP) foam pads) used in hockey helmets.

The inner pad 15 may be configured in various other ways in other embodiments. For instance, in other embodiments, the inner pad 15 may comprise any number of pad members (e.g.: two pad members such as one pad member that contacts at least part of the crown region CR, top region TR, and left and right side regions LS, RS of the player's head and another pad member that contacts at least part of the back region BR, top region TR, and left and right side regions LS, RS of the player's head; a single pad member that contacts at least part of the crown region CR, top region TR, left and right side regions LS, RS, and back region BR of the player's head; etc.).

Although in embodiments considered above the sport helmet 10 is a hockey helmet for protecting the head of a hockey player, in other embodiments, a sport helmet constructed using principles described herein in respect of the sport helmet 10 may be another type of sport helmet for protecting the head of a player of another type of contact sport (sometimes referred to as "full-contact sport" or "collision sport") in which there are significant impact forces on the player due to player-to-player and/or player-to-object contact. For example, in one embodiment, a sport helmet constructed using principles described herein in respect of the sport helmet 10 may be a lacrosse helmet for protecting the head of a lacrosse player. As another example, in one embodiment, a sport helmet constructed using principles described herein in respect of the sport helmet 10 may be a football helmet for protecting the head of a football player.

To facilitate the description, any reference numeral designating an element in one figure designates the same element if used in any other figures. In describing the embodiments, specific terminology was resorted to for the sake of clarity but the invention is not intended to be limited to the specific terms so selected, and it is understood that each specific term comprises all equivalents.

Unless otherwise indicated, the drawings are intended to be read together with the specification, and are to be considered a portion of the entire written description of this invention. As used in the preceding description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure.

The above description of embodiments of the invention should not be interpreted in a limiting manner since other variations, modifications and refinements are possible within the spirit and scope of the invention. The scope of the invention is defined in the appended claims and their equivalents.

The invention claimed is:

1. An article of sport gear comprising:
a) a first component; and
b) a second component adjacent to the first component and comprising:
a core of polymeric cellular material comprising a first side and a second side opposite one another, the core of polymeric cellular material comprising a body of expanded polymeric microspheres, each of the expanded polymeric microspheres comprising a polymeric shell expanded by a fluid encapsulated in the polymeric shell, the body of expanded polymeric microspheres constitutes at least 85% of the core of polymeric cellular material by weight; and
a covering on the core of polymeric cellular material, the covering being arranged to cover at least part of the first side and at least part of the second side of the core of polymeric cellular material.

2. The article of sport gear of claim 1, wherein the first component comprises rigid material that is stiffer than the polymeric cellular material.

3. The article of sport gear of claim 2, wherein the first component is a shell.

4. The article of sport gear of claim 1, wherein a three-dimensional configuration of the second component generally conforms to a three-dimensional configuration of the first component.

5. The article of sport gear of claim 1, wherein a thickness of the second component is greater than a thickness of the first component.

6. The article of sport gear of claim 1, wherein the body of expanded polymeric microspheres constitutes at least 90% of the core of polymeric cellular material by weight.

7. The article of sport gear of claim 1, wherein the body of expanded polymeric microspheres constitutes at least 95% of the core of polymeric cellular material by weight.

8. The article of sport gear of claim 1, wherein the expanded polymeric microspheres have a size between 20 microns and 120 microns.

9. The article of sport gear of claim 1, wherein a density of the expanded polymeric microspheres is less than 0.04 g/cm$^3$.

10. The article of sport gear of claim 1, wherein a density of the expanded polymeric microspheres is no more than 0.035 g/cm$^3$.

11. The article of sport gear of claim 1, wherein the covering is arranged to cover at least a majority of the first side of the core of polymeric cellular material.

12. The article of sport gear of claim 11, wherein the covering is arranged to cover at least a majority of the second side of the core of polymeric cellular material.

13. The article of sport gear of claim 1, wherein the core of polymeric cellular material has a periphery comprising the first side and the second side of the core of polymeric cellular material and the covering is arranged to cover at least a majority of the periphery of the core of polymeric cellular material.

14. The article of sport gear of claim 1, wherein the covering envelopes the core of polymeric cellular material.

15. The article of sport gear of claim 1, wherein: the core of polymeric cellular material has a periphery comprising (i) the first side and the second side of the core of polymeric cellular material and (ii) a lateral side between the first side and the second side of the core of polymeric cellular material; and the covering comprises a first covering portion and a second covering portion which meet at the lateral side of the core of polymeric cellular material such that the covering envelopes the core of polymeric cellular material.

16. The article of sport gear of claim 1, wherein the covering comprises a fabric layer.

17. The article of sport gear of claim 16, wherein the fabric layer is a non-woven fabric layer.

18. The article of sport gear of claim 1, wherein the covering comprises a decoration.

19. The article of sport gear of claim 18, wherein the decoration is a sublimated decoration.

20. The article of sport gear of claim 1, wherein the covering is molded onto the core of polymeric cellular material to retain integrity of the core of polymeric cellular material.

21. The article of sport gear of claim 1, wherein the covering is bonded to the core of polymeric cellular material via an adhesive.

22. The article of sport gear of claim 1, wherein the covering has a thickness of at least 0.05 mm.

23. The article of sport gear of claim 1, wherein the second component comprises a hole extending through the core of polymeric cellular material and defined by an interior surface of the core of polymeric cellular material that is at least partially covered by the covering.

24. The article of sport gear of claim 23, wherein the hole is a ventilation hole.

25. The article of sport gear of claim 1, wherein the covering comprises a first portion made of a given material disposed on the first side of the core of polymeric cellular material and a second portion made of the given material disposed on the second side of the core of polymeric cellular material.

26. The article of sport gear of claim 1, comprising a third component adjacent to the first component, spaced from the second component and comprising:
- a core of polymeric cellular material comprising a first side and a second side opposite one another, the core of polymeric cellular material of the third component comprising a body of expanded polymeric microspheres, each of the expanded polymeric microspheres of the third component comprising a polymeric shell expanded by a fluid encapsulated in the polymeric shell; and
- a covering on the core of polymeric cellular material of the third component, the covering being arranged to cover at least part of the first side and at least part of the second side of the core of polymeric cellular material of the third component.

27. The article of sport gear of claim 1, wherein the first component is an outer shell and the second component is an inner pad disposed within the outer shell.

28. The article of sport gear of claim 1, wherein the article of sport gear is a sport helmet.

* * * * *